United States Patent
Endo

(10) Patent No.: US 11,172,086 B2
(45) Date of Patent: Nov. 9, 2021

(54) DRAWER MECHANISM AND IMAGE FORMING APPARATUS

(71) Applicant: Ricoh Company, Ltd., Tokyo (JP)

(72) Inventor: Tsuyoshi Endo, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 17/015,828

(22) Filed: Sep. 9, 2020

(65) Prior Publication Data
US 2021/0075927 A1    Mar. 11, 2021

(30) Foreign Application Priority Data
Sep. 11, 2019 (JP) .............................. JP2019-165598

(51) Int. Cl.
*H04N 1/04* (2006.01)
*H04N 1/00* (2006.01)

(52) U.S. Cl.
CPC ..... *H04N 1/00533* (2013.01); *H04N 1/00543* (2013.01); *H04N 1/00557* (2013.01); *H04N 1/00559* (2013.01)

(58) Field of Classification Search
CPC ........... H04N 1/00535; H04N 1/00533; H04N 1/00543; H04N 1/0055; H04N 1/00559
See application file for complete search history.

(56) References Cited

U.S. PATENT DOCUMENTS

| | | | | |
|---|---|---|---|---|
| 5,511,494 | A * | 4/1996 | Scott | E05G 7/008 108/137 |
| 5,723,850 | A * | 3/1998 | Lambert | G07G 1/0027 235/22 |
| 5,781,313 | A * | 7/1998 | Nose | H04N 1/1013 358/497 |
| 6,687,027 | B1 * | 2/2004 | Fang | H04N 1/1017 358/471 |
| 10,610,073 | B1 * | 4/2020 | Lucas | A47L 9/2873 |
| 2009/0060612 | A1 | 3/2009 | Kohara et al. | |
| 2009/0317127 | A1 * | 12/2009 | Kishi | G03G 21/1638 399/110 |
| 2014/0167580 | A1 | 6/2014 | Funayama et al. | |
| 2014/0167587 | A1 | 6/2014 | Takenaka et al. | |

(Continued)

FOREIGN PATENT DOCUMENTS

| | | |
|---|---|---|
| JP | 6-239476 | 8/1994 |
| JP | 11-055838 | 2/1999 |
| JP | 2005192704 A * | 7/2005 |

(Continued)

*Primary Examiner* — Cheukfan Lee
(74) *Attorney, Agent, or Firm* — Xsensus LLP

(57) ABSTRACT

A drawer mechanism includes a housing, a drawer, and a connector. The housing has at least one open side. The drawer is incorporated in the housing and insertable into and drawable from the open side of the housing. The connector connects the housing and a rear side of the drawer in a drawing direction of the drawer. The connector includes a first pivoting member, a second pivoting member, and a biasing member. The biasing member is disposed at a contact portion between the first pivoting member and the second pivoting member and configured to bias the first pivoting member and the second pivoting member in directions in which the first pivoting member and the second pivoting member are closed.

7 Claims, 9 Drawing Sheets

(56) References Cited

U.S. PATENT DOCUMENTS

2014/0169828 A1 6/2014 Ohta et al.
2016/0300558 A1 10/2016 Hirakawa et al.

FOREIGN PATENT DOCUMENTS

| JP | 2017-084905 | 5/2017 |
| JP | 2018-109698 | 7/2018 |
| JP | 2018-124343 | 8/2018 |
| JP | 2018-146931 | 9/2018 |

* cited by examiner

DRAWER MECHANISM AND IMAGE FORMING APPARATUS

CROSS-REFERENCE TO RELATED APPLICATION

This patent application is based on and claims priority pursuant to 35 U.S.C. § 119(a) to Japanese Patent Application No. 2019-165598, filed on Sep. 11, 2019, in the Japan Patent Office, the entire disclosure of which is hereby incorporated by reference herein.

BACKGROUND

Technical Field

The present disclosure relates to a drawer mechanism and an image forming apparatus.

Description of the Related Art

There is known a mechanism or a configuration in which a drawer is semi-automatically retracted when the drawer is installed on a table or the like.

In such a drawer mechanism, there is a demand for a configuration in which the drawer can be opened and closed without entangling a power cord, a local area network (LAN) cable, or the like when an electronic device or the like is placed above the drawer.

SUMMARY

In an aspect of the present disclosure, a drawer mechanism includes a housing, a drawer, and a connector. The housing has at least one open side. The drawer is incorporated in the housing and insertable into and drawable from the open side of the housing. The connector connects the housing and a rear side of the drawer in a drawing direction of the drawer. The connector includes a first pivoting member, a second pivoting member, and a biasing member. The biasing member is disposed at a contact portion between the first pivoting member and the second pivoting member and configured to bias the first pivoting member and the second pivoting member in directions in which the first pivoting member and the second pivoting member are closed.

In another aspect of the present disclosure, an image forming apparatus includes the drawer mechanism and an image forming device on an upper portion of the drawer mechanism.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
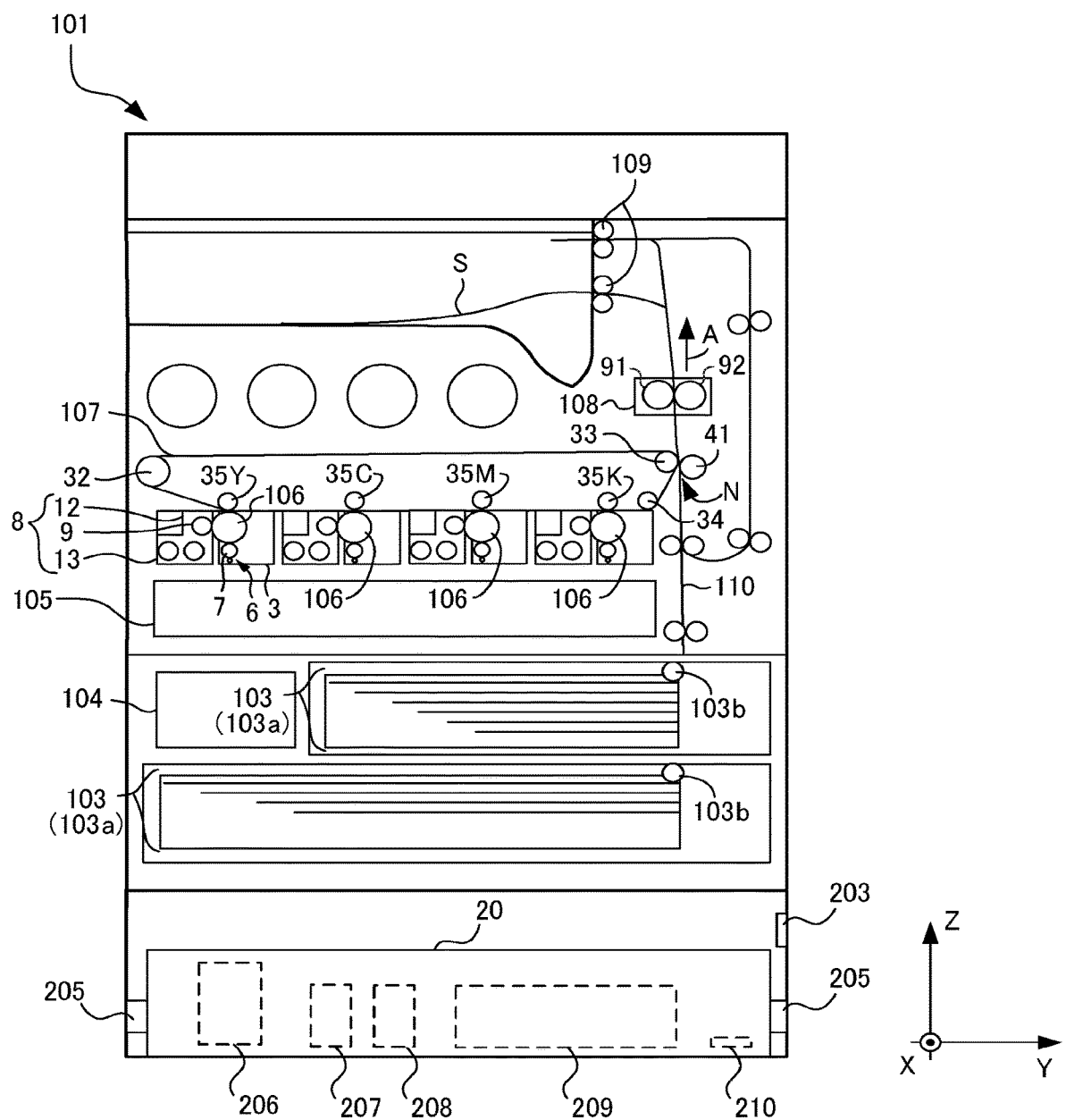
FIG. 1 is a schematic view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, an image forming apparatus according an embodiment of the present disclosure is described with reference to the accompanying drawings. FIG. 1 is a schematic view of an electrophotographic color printer (hereinafter referred to as "printer") as an image forming apparatus according to an embodiment of the present disclosure. Note that the image forming apparatus according to an embodiment of the present disclosure is not limited to a printer, and may be a copier, a facsimile machine, or a multifunction peripheral having at least two functions of a printer, a copier, a facsimile machine, a scanner, and the like.

As illustrated in FIG. 1, an image forming apparatus according to the present embodiment includes a sheet feeding unit 103, a control unit 104, an optical writing unit 105, photoconductors 106, and an intermediate transfer belt 107. The intermediate transfer belt 107 is an intermediate transfer member.

The image forming apparatus 101 further includes a fixing unit 108, and sheet ejection rollers 109. The fixing unit 108 fixes a toner image formed on a sheet S as an image. The sheet ejection rollers 109 eject the sheet S and are provided at a rearmost end of a conveyance path 110 that includes rollers and the like to convey the sheet S.

In the description of the present embodiment, only a configuration in which the image forming apparatus 101 operates as an electrophotographic full-color image forming apparatus that reads image information and forms an image on the surface of the sheet S will be described. However, embodiments of the present disclosure are not limited to such a configuration. For example, a configuration in which an image transmitted from another terminal is formed on the surface of the sheet S may be employed, or an inkjet method or the like may be employed, and embodiments of the present disclosure are not limited to a specific image forming method.

In the image forming apparatus 101, the sheet feeding unit 103 includes sheet feeding trays 103a to stack and store the sheets S and sheet feeding rollers 103b.

The optical writing unit 105 forms an image as a latent image of an electrophotographic image on each of the photoconductors 106.

The latent image formed on each of the photoconductors 106 is developed as a toner image by adhesion of toner, and then transferred as the toner image onto the sheet S via the intermediate transfer belt 107.

The toner image transferred onto the sheet S is subjected to heat and pressure in the fixing unit 108 to be fixed as an image, and is ejected by the sheet ejection rollers 109.

The sheet feeding unit 103, the control unit 104, the optical writing unit 105, the photoconductors 106, the intermediate transfer belt 107, the fixing unit 108, the sheet ejection rollers 109, and the like have same configurations as the configuration of a general image forming apparatus, and descriptions thereof will be appropriately omitted.

Each of the photoconductors 106 has a drum shape in which an organic photosensitive layer is formed on a surface of a drum base of each of the photoconductors 106. The photoconductors 106 are rotationally driven in a clockwise direction in FIG. 1 by drivers.

A charging device 6 causes discharge between a charging roller 7 and the photoconductor 106 while bringing the charging roller 7, which is a charging member to which a charging bias is applied, into contact with or close to the photoconductor 106. Thus, the charging device 6 uniformly charges the surface of the photoconductor 106. Instead of the method of bringing the charging member such as the charging roller 7 into contact with or close to the photoconductor 106, a method using a charger may be employed. The surface of the photoconductor 106 uniformly charged by the charging roller 7 is optically scanned and exposed by a laser beam or the like emitted from the optical writing unit 105, and bears an electrostatic latent image for each color of yellow, magenta, cyan, and black. The electrostatic latent image is developed into a toner image of each color by each of developing devices 8 using toner of each color. The toner image on the photoconductor 106 is primarily transferred onto a surface (toner image bearing surface) of the intermediate transfer belt 107 formed of an endless belt.

A drum cleaner 3 removes transfer residual toner adhering to the surface of the photoconductor 106 after a primary transfer process (passage of a primary transfer nip described later), and includes a cleaning brush roller that is rotationally driven, a cleaning blade, and the like. A free end of the cleaning blade is brought into contact with the photoconductor 106 in a state in which the cleaning blade is cantilevered. The drum cleaner 3 scrapes off the transfer residual toner from the surface of the photoconductor 106 with the rotating cleaning brush roller, and scrapes off the transfer residual toner from the surface of the photoconductor 106 with the cleaning blade for cleaning.

The charge remover removes residual charge of the photoconductor 106 after the photoconductor 106 is cleaned by the drum cleaner 3. As a result of the charge removal, the surface of the photoconductor 106 is initialized to prepare for the next image formation.

Each of the developing devices 8 includes a developing unit 12 including a developing roller 9 serving as a developer bearer, and a developer conveyor 13 that stirs and conveys the developer. The developer conveyor 13 conveys the developer to the developing roller 9 while stirring the developer by a plurality of screw-shaped stirring members.

The intermediate transfer belt 107 is wound around, supported and stretched by a driving roller 32, a secondary transfer back surface roller 33, a cleaning backup roller 34, and four primary transfer rollers 35Y, 35M, 35C, and 35K. The driving roller 32, the secondary transfer back surface roller 33, the cleaning backup roller 34, and the four primary transfer rollers 35Y, 35M, 35C, and 35K are disposed inside the loop of the intermediate transfer belt 107. The intermediate transfer belt 107 is endlessly moved and conveyed in a counterclockwise direction in FIG. 1 by the rotational force of the driving roller 32.

The four primary transfer rollers 35Y, 35M, 35C, and 35K sandwich the intermediate transfer belt 107, which is endlessly moved, with the photoconductors 106 of the respective colors of yellow (Y), magenta (M), cyan (C), and black (K), and form primary transfer nips serving as transfer portions for Y, M, C, and K at which surfaces of the intermediate transfer belt 107 and the photoconductors 106 come into contact with each other. A primary transfer bias is applied to each of the primary transfer rollers 35Y, 35M, 35C, and 35K by a transfer bias power supply. Accordingly, a transfer electric field is formed between each of the toner images of the respective colors of Y, M, C, and K on the photoconductor 106 and each of the primary transfer rollers 35Y, 35M, 35C, and 35K, respectively.

For example, the toner image Y formed on the photoconductor 106Y for yellow enters the primary transfer nip for yellow as the photoconductor 106Y for yellow rotates. Then, the toner image Y is primarily transferred from the photoconductor 106Y onto the intermediate transfer belt 107 by the action of the transfer electric field and nip pressure. The intermediate transfer belt 107 onto which the toner image Y has been primarily transferred in this manner sequentially passes through the primary transfer nips for M, C, and K, thereafter. Then, each of the toner images for M, C, and K on the photoconductors 106M, 106C, and 106K, respectively, are sequentially superimposed on the toner image Y and primarily transferred. Accordingly, a composite toner image, in which the toner images of the four colors are superimposed, is formed on the intermediate transfer belt 107 in the primary transfer process. Instead of the primary transfer rollers 35Y, 35M, 35C, and 35K, a transfer charger or a transfer brush may be used as the primary transfer member.

A secondary transfer roller 41 disposed outside the loop of the intermediate transfer belt 107 sandwiches the intermediate transfer belt 107 with the secondary transfer back surface roller 33 inside the loop of the intermediate transfer belt 107 to form a secondary transfer nip N with a front surface of the intermediate transfer belt 107. A secondary transfer bias is applied to the secondary transfer back surface roller 33. Accordingly, a secondary transfer electric field is formed between the secondary transfer back surface roller 33 and the intermediate transfer belt 107 to electrostatically move toner having negative polarity from the secondary transfer back surface roller 33 toward the sheet S.

The fixing unit 108 is disposed above the secondary transfer nip N. The sheet S on which a full-color toner image is transferred is fed into the fixing unit 108. The fed sheet S is sandwiched in a fixing nip in which a fixing roller 91 having a heat source therein and a pressure roller 92 are in contact with each other, and toner in the full-color toner image is softened and fixed under heat and pressure. The sheet S after the fixing is ejected outside of the image forming apparatus 101 by the sheet ejection rollers 109.

In recent years, there has been a need for a configuration in which an image forming apparatus communicates with a personal computer (PC), another terminal, or the like via a network.

Therefore, for example, in the present embodiment, a rack table 200 is provided below the image forming apparatus 101 serving as an image forming device that forms an image on the sheet S.

Figure 2:
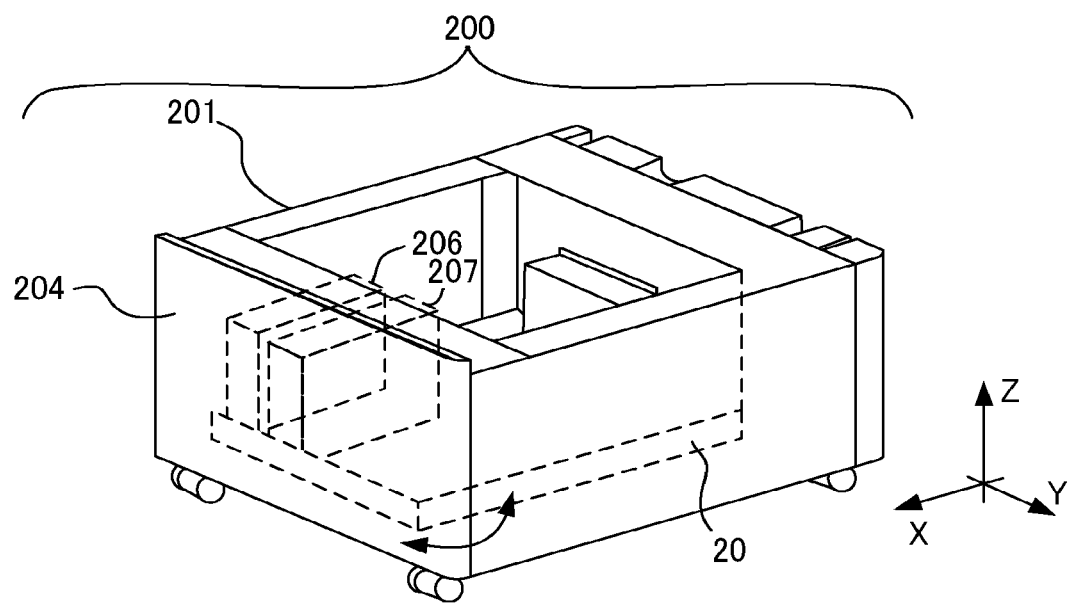
FIG. 2 is a perspective view of an example of the structure of a drawer mechanism according to an embodiment of the present disclosure.
Figure 3:
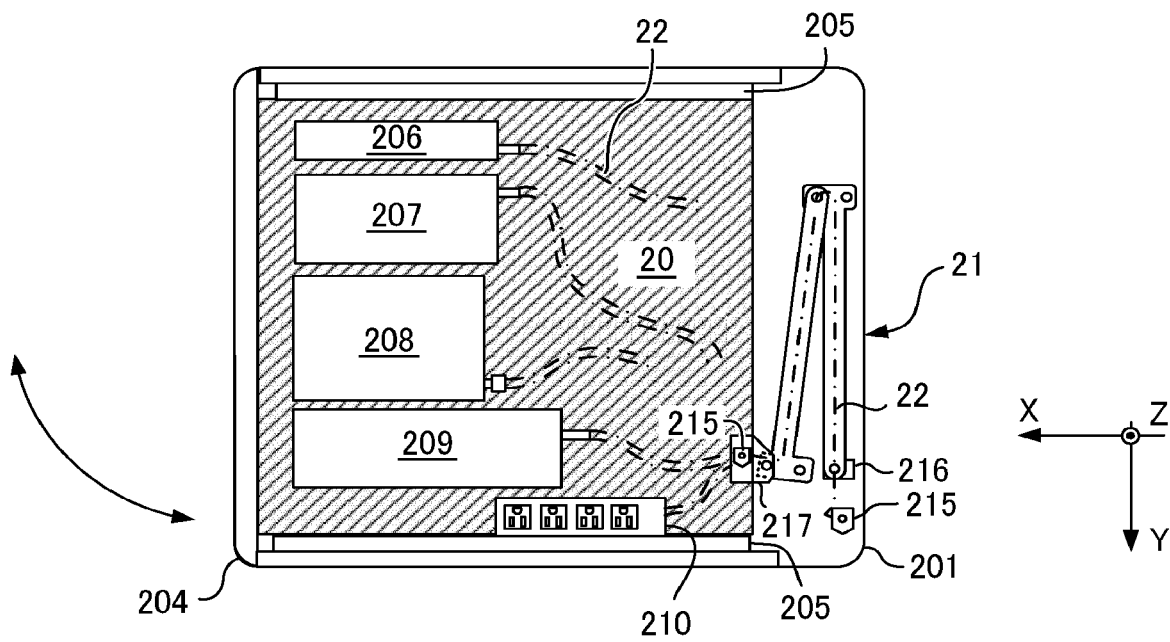
FIG. 3 is a plan view of an example of the structure of the drawer mechanism illustrated in FIG. 2.

FIGS. 2 and 3 illustrate a schematic configuration of the rack table 200.

The rack table 200 includes a housing 201, an exhaust fan 203, a front cover 204, and a drawer 20. The exhaust fan 203 is provided inside the rack table 200. The front cover 204 is attached to a front surface of the housing 201. The drawer 20 is capable of moving forward and backward so as to be drawn out from the housing 201 in a state in which the front cover 204 is opened.

The rack table 200 further includes a network connection storage device 206, an auxiliary storage device 207, a wireless LAN router 208, an uninterruptible power supply device 209, and a power supply tap 210. The network connection storage device 206, the auxiliary storage device 207, the wireless LAN router 208, the uninterruptible power supply device 209, and the power supply tap 210 are electronic devices mounted on the drawer 20.

The rack table 200 further includes a cord guide 21, a plurality of wires 22, and a locking mechanism 40. The cord guide 21 serves as a connector to connect the drawer 20 and the housing 201. The plurality of wires 22 is held by the cord guide 21 to connect the housing 201 and the electronic devices mounted on the drawer 20. The locking mechanism 40 is a lock to lock the drawer 20 in a state in which the drawer 20 is accommodated in the housing 201.

The network connection storage device 206, the auxiliary storage device 207, the wireless LAN router 208, the uninterruptible power supply device 209, and the power supply tap 210 may be any of types of electronic devices mounted on the drawer 20, and the functions and configurations thereof may be the same as functions and configurations used in general devices and will not be described.

The housing 201 is a housing in which at least one side (side to which the front cover 204 is attached in the present embodiment) of the housing can be opened. The housing 201 supports the drawer 20 by guide rails 205 provided on lateral sides of the housing 201 so that the drawer 20 is movable forward and backward in X direction illustrated in FIGS. 2 and 3.

The guide rails 205 are a pair of guides provided on the lateral sides of the housing 201 along the X direction, and function as support members that support the drawer 20 by being fitted to the lateral sides of the drawer 20.

Since the sliding resistance of the guide rails 205 is sufficiently small, the drawer 20 can be moved with a small force when the drawer 20 is moved forward and backward in the X direction as described later.

The drawer 20 is incorporated in the housing 201 and held so as to be movable forward and backward in ±X directions along the guide rails 205.

A variable clamp 215 serving as a wiring fixture is attached to a rear surface of the drawer 20 in the drawing direction, that is, a surface in −X direction, and the cord guide 21 is connected to the rear surface of the drawer 20 by a connector 217.

The connector 217 is a fixing member having a screw hole or the like to which the cord guide 21 is rotatably attached. A method of attaching the connector 217 is not particularly limited. Besides screwing, for example, a combination of a bolt and a nut or a method of inserting and fixing a pin or the like may be used as long as the cord guide 21 can be rotatably supported.

The cord guide 21 serves as a connector that connects the housing 201 and the rear surface of the drawer 20 in a direction of the drawing operation, that is, the X direction.

The wires 22 are placed in the cord guide 21 as indicated by dashed lines in FIG. 3 in which the wires 22 are partially omitted.

Here, the wires 22 may be, for example, power supply cables to supply power to the power supply tap 210, communication wiring such as LAN cables to connect a wireless LAN router and the image forming apparatus 101, or other wiring.

The variable clamps 215 are disposed on the rear surface of the drawer 20 at a drawer outlet through which the drawer 20 is pulled out, and serves as a wiring fixture to fix the wires 22 so that the wires 22 are not moved by being clamped at the position.

In this way, one of the variable clamp 215 presses the wires 22 at the drawer outlet, even when the cord guide 21 operates as described later at the time of the drawing operation of the drawer 20, a force applied to the electronic devices mounted on the drawer 20 through the wires 22 can be restrained.

Further, when the other one of the variable clamps 215 is provided in the vicinity of the connector 217 between the cord guide 21 and the drawer 20, an accident such as unintended removal of the wires 22 or collision between the electronic devices can be prevented, and movement of the wires 22 in the cord guide 21 can be restrained.

More preferably, the variable clamp 215 is additionally disposed in the vicinity of the housing bottom surface connector 216, which is a connector between the housing 201 and the cord guide 21.

In this way, the wires 22 placed on the cord guide 21 are clamped by the variable clamps 215 in the vicinity of both ends of the cord guide 21, and the movement of the wires 22 at the both ends is regulated.

Figure 4:
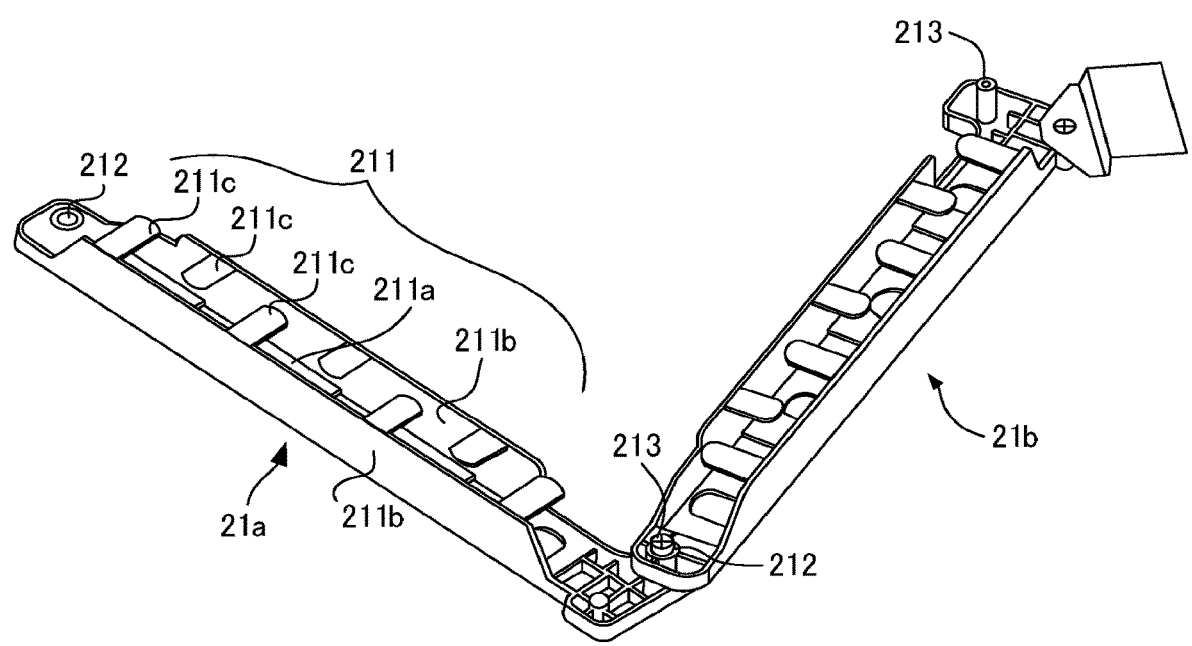
FIG. 4 is a perspective view of pivoting members pulled out the drawer mechanism illustrated in FIG. 2.
Figure 5A:
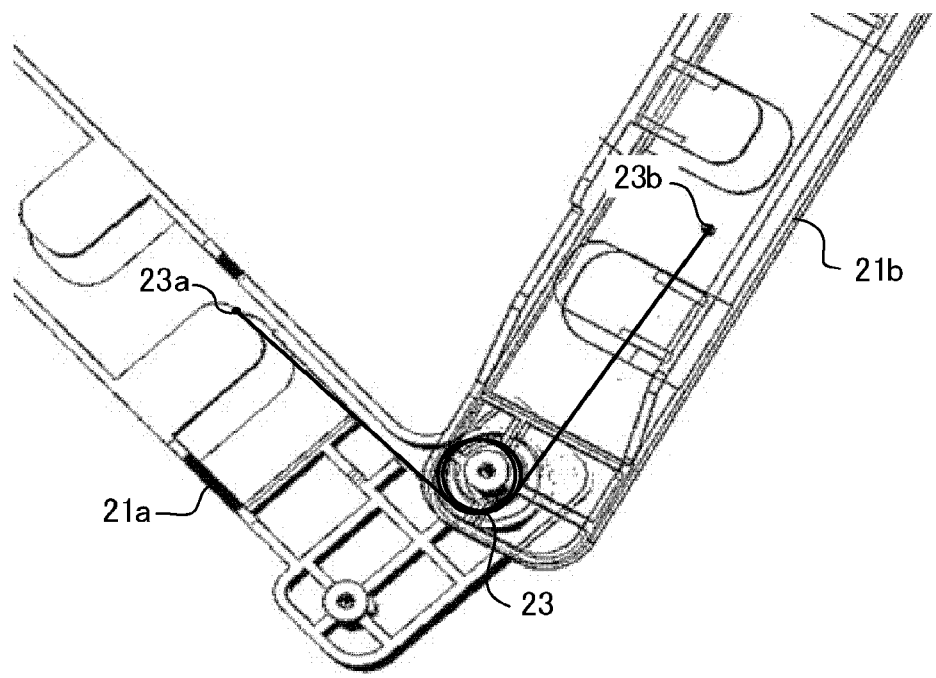
FIGS. 5A and 5B are enlarged views of an example of the shapes of contact portions of the pivoting members illustrated in FIG. 4.
Figure 5B:
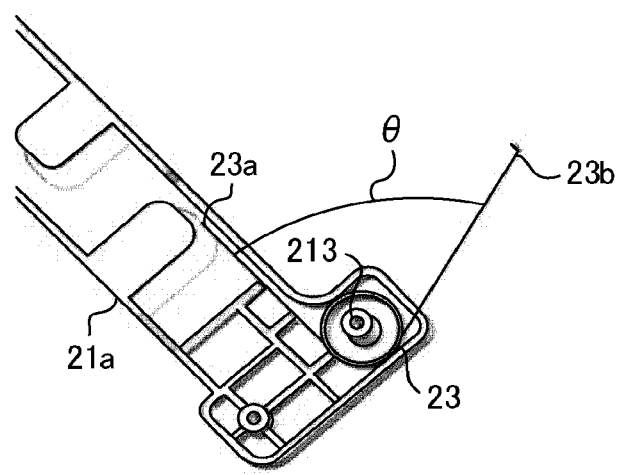

As illustrated in FIGS. 4, 5A, and 5B, the cord guide 21 includes two pivoting members 21a and 21b, and a torsion spring 23. The torsion spring 23 is a biasing member disposed between the two pivoting members 21a and 21b to bias the pivoting members 21a and 21b in directions in which the pivoting members 21a and 21b are closed.

Since the pivoting members 21a and 21b have the same shape, the pivoting member 21a is described as an example.

Figure 6:
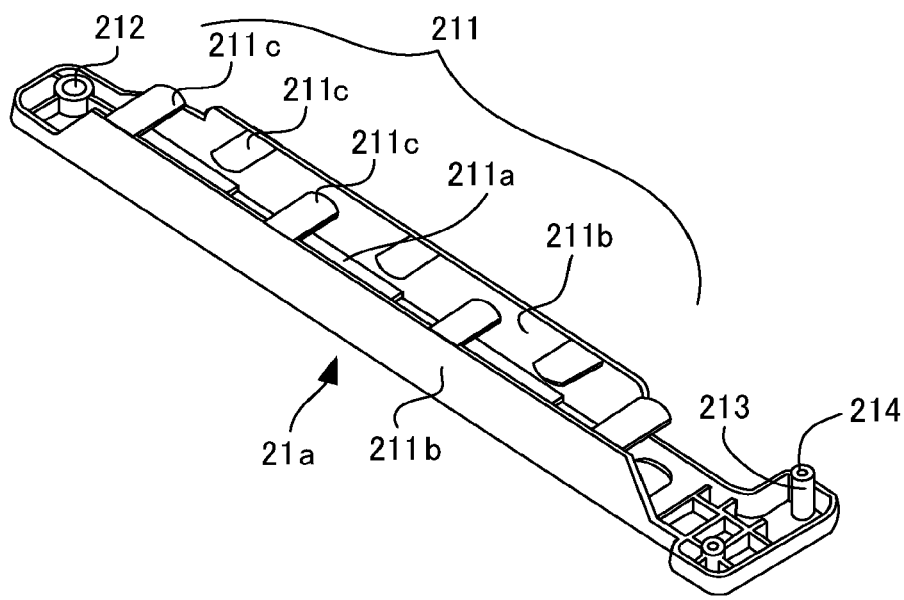
FIG. 6 is a schematic perspective view of one of the pivoting members.

As illustrated in FIGS. 4 and 6, the pivoting member 21a is a plastic molded member, and includes a linear portion 211, an opening portion 212, and a projecting portion 213. The linear portion 211 extends linearly and holds the wires 22. The opening portion 212 is formed at one end of the pivoting member 21a. The projecting portion 213 is provided at the other end of the pivoting member 21a. The projecting portion 213 has an outer diameter that can be inserted into the opening portion 212 and has a boss hole through which a screw is screwed.

As illustrated in FIG. 6, the pivoting member 21a also includes a bottom portion 211a, a side surface portion 211b, and a plurality of convex portions 211c. The bottom portion 211a is a portion of the linear portion 211 on which the wires 22 is mounted. The side surface portion 211b rises from the bottom portion 211a. The plurality of convex portions 211c are formed to face the bottom portion 211a and are formed so as to alternately intersect with each other.

The shape of the linear portion 211 of the pivoting member 21a is not limited to such a configuration, and may be any shape as long as the wires 22 can be held inside of the pivoting member 21a. For example, the shape of the linear portion 211 may be a hollow square cylinder or a cylinder with a notch. In addition, a so-called U-shape in which only an upper surface of the linear portion 211 is cut off may be used.

Figure 7:
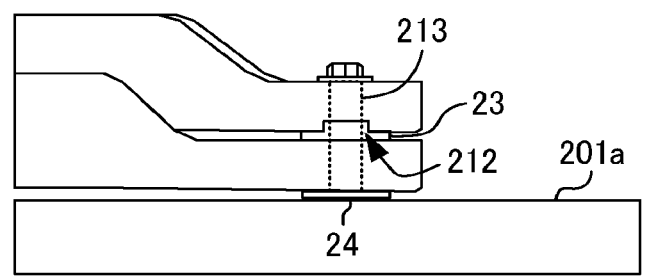
FIG. 7 is a side view of a state in which a projecting portion of one of the pivoting members is inserted into an opening portion of the other one of the pivoting members.

As illustrated in an enlarged view of FIG. 7, the projecting portion 213 and the opening portion 212 are fitted to each other in such a manner that the projecting portions 213 of the pivoting members 21a and 21b arranged in opposite directions by 180 degrees are inserted into the opening portions 212. The boss hole 214 at a tip end of the projecting portion 213 is fastened and fixed by a washer and a screw.

At this time, as illustrated in FIG. 7, the torsion spring 23 is disposed between the projecting portion 213 and the opening portion 212, and one end portion 23a of the torsion spring 23 is fixed to the pivoting member 21a, and the other end portion 23b is fixed to the pivoting member 21b.

With such a configuration, when the angle θ formed by the torsion spring 23 changes with the projecting portion 213 as the rotation center, the torsion spring 23 functions to bias each of the pivoting member 21a and the pivoting member 21b in a direction in which the angle θ decreases.

That is, the torsion spring 23 functions as a biasing member that biases the pivoting member 21a, which is a first pivoting member, and the pivoting member 21b, which is a second pivoting member, in directions in which the pivoting members 21a and 21b are closed to each other.

In addition, the projecting portion 213 and the opening portion 212 are positions at which the pivoting member 21a, which is the first pivoting member, and the pivoting member 21b, which is the second pivoting member, are connected to each other. Thus, the projecting portion 213 and the opening portion 212 serve as contact portions in the present embodiment together with the torsion spring 23.

The above operation is described in more detail.

Figure 8A:
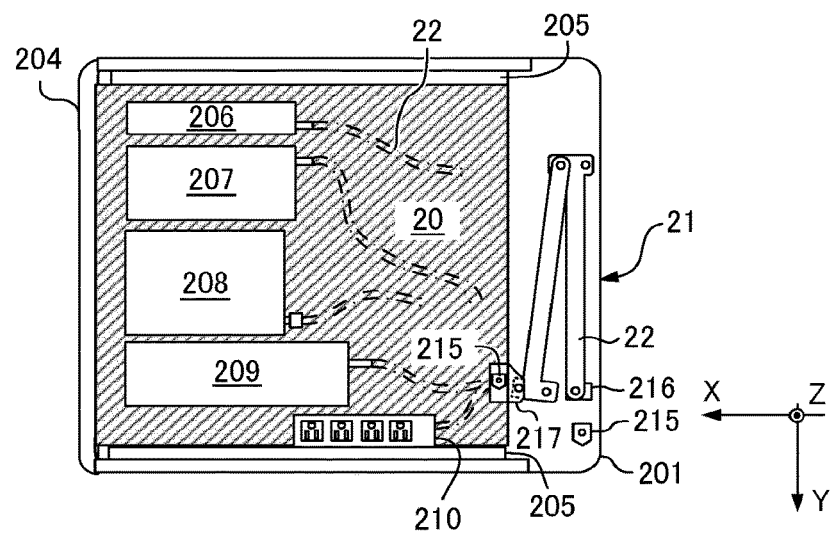
FIGS. 8A and 8B are plan views of an example of operation of a configuration in which the pivoting members, a drawer, and a housing are connected.

First, in a state in which the drawer 20 is housed in the housing 201, as illustrated in FIG. 8A, the pivoting member 21a and the pivoting member 21b are bent around the position of the torsion spring 23, that is, the position at which the projecting portion 213 and the opening portion 212 are fitted, and are housed in a folded state.

Figure 8B:
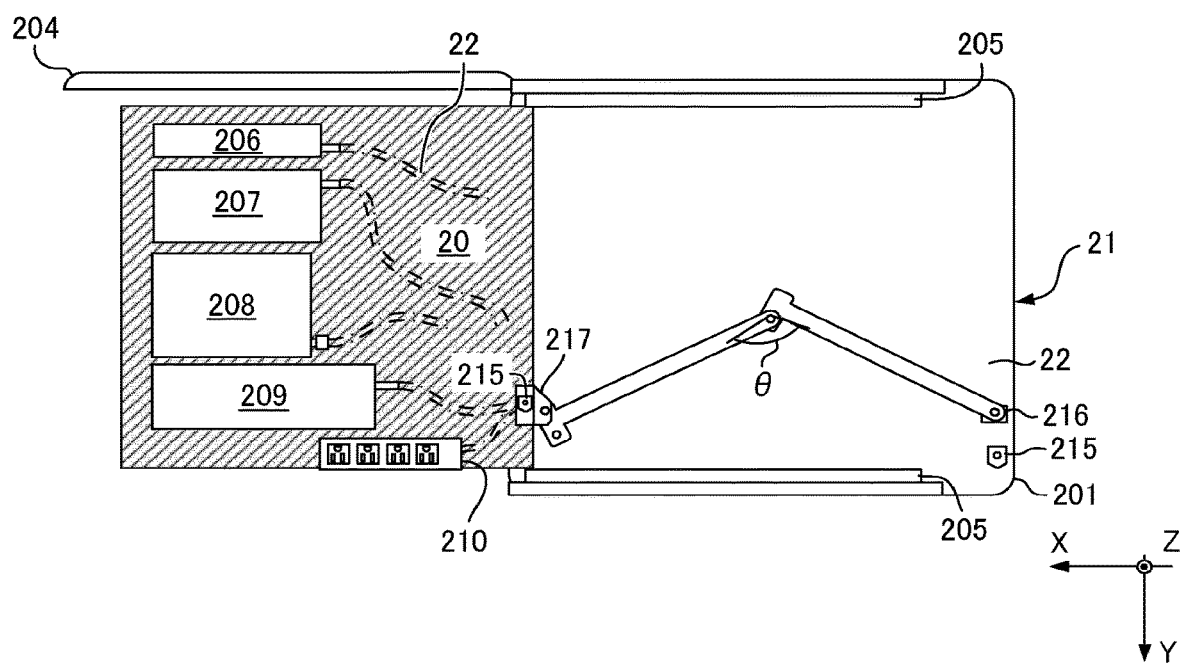

Next, when the front cover 204 is opened and the drawer 20 is pulled out from the housing 201, as illustrated in FIG. 8B, the drawer 20 is pulled out in the +X direction along the guide rails 205, and the pivoting member 21a and the pivoting member 21b move in directions in which the angle θ formed by the torsion spring 23 is widened while the pivoting member 21a and the pivoting member 21b are opened. In FIGS. 8A and 8B, at least a part of the wires 22 is placed on the cord guide 21.

At this time, since both ends of the wires 22 placed on the cord guide 21 are pressed by the variable clamps 215, unnecessary tension or the like caused by such an operation of the cord guide 21 when the shape of the wire 22 changes along the shape of the cord guide 21 can be restrained.

In the drawing operation, as illustrated in the enlarged view in FIG. 7, to reduce the sliding resistance between the bottom surface 201a of the housing 201 and the cord guide 21, a minute bottom surface protrusion 24 may be provided on a bottom surface of the cord guide 21.

The bottom surface protrusion 24 may be provided, for example, between the pivoting member 21a and the pivoting member 21b opposite to the projecting portion 213, but is not limited to such a position.

Figure 9:
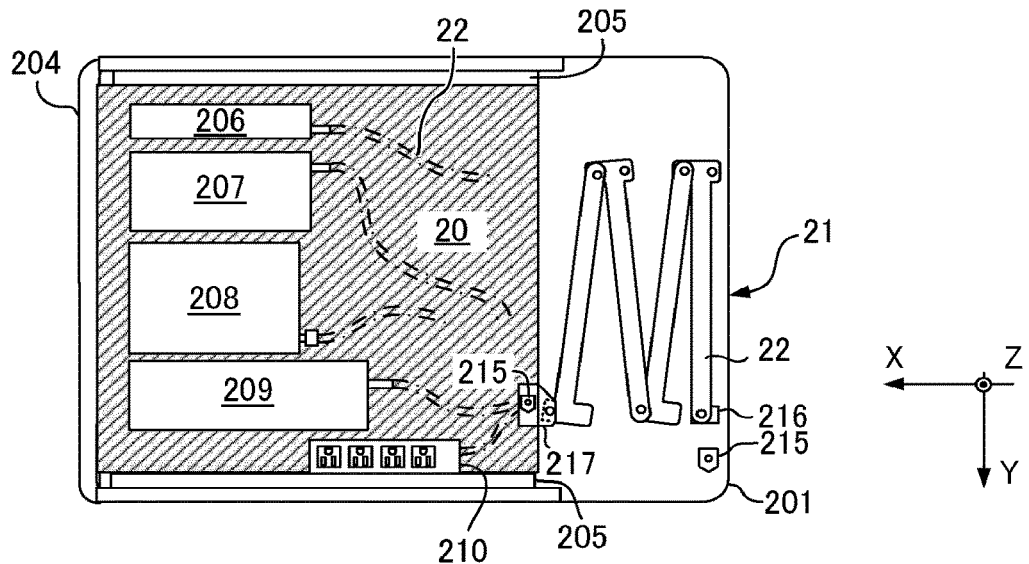
FIG. 9 is a plan view of another example of the configuration in which the pivoting members, the drawer, and the housing are connected.
Figure 10:
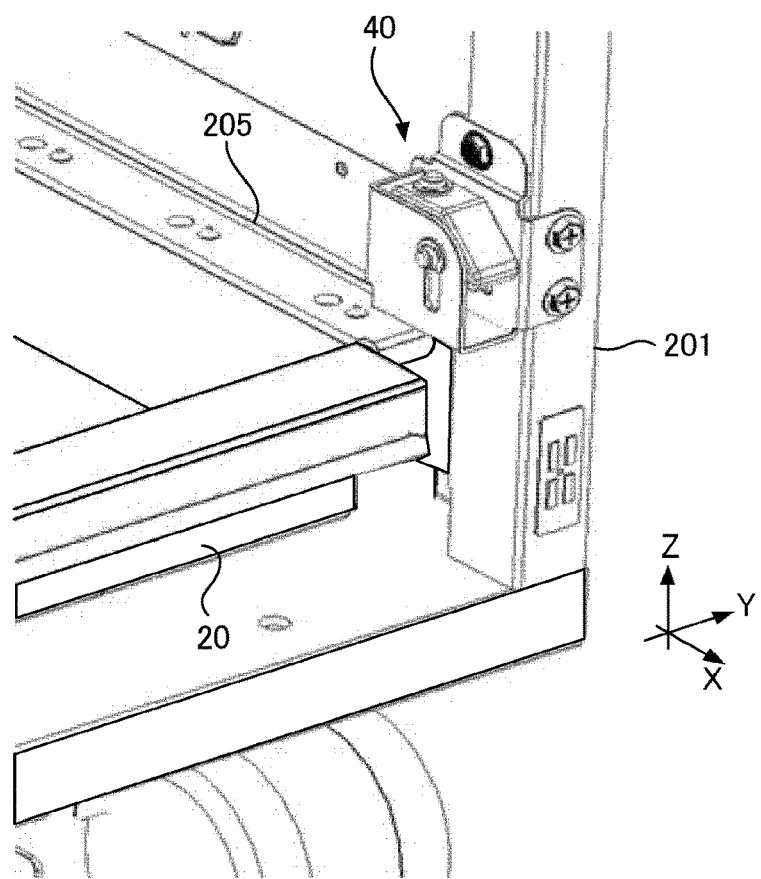
FIG. 10 is a perspective view of an example of the configuration of the drawer mechanism including a lock.

In the present embodiment, the cord guide 21 includes a pair of the pivoting member 21a and the pivoting member 21b. However, a plurality of pairs of pivoting member 21a and pivoting member 21b may be continuously connected to constitute the cord guide 21 as illustrated in FIG. 9, for example.

In this case also, the pivoting member 21a serving as the first pivoting member and the pivoting member 21b serving as the second pivoting member have the same shape, and are inverted by 180 degrees from each other and are connected at the position at which the projecting portion 213 and the opening portion 212 are fitted.

In this way, the projecting portion 213 and the opening portion 212 function as connectors according to the present embodiment.

In the present embodiment, the locking mechanism 40 is attached to the housing 201 at a side at which the front cover 204 is attached.

Figure 11A:
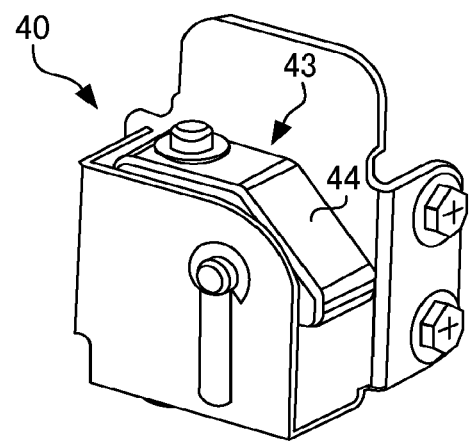
FIGS. 11A and 11B are perspective views of an example of the configuration of the lock.
Figure 11B:
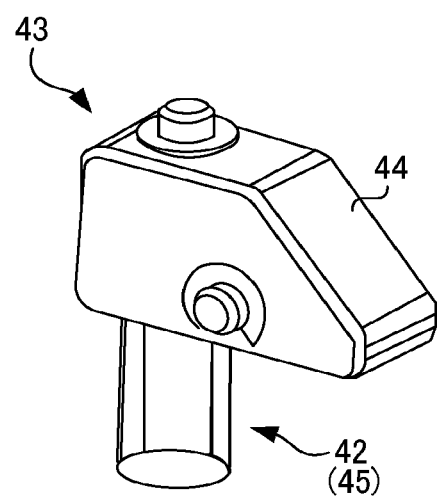

As illustrated in FIGS. 11A and 11B, the locking mechanism 40 incorporates a compression spring 45 and includes a lock shaft 42 and a striker receiver 43. The lock shaft 42 extends in the −Z direction. The striker receiver 43 comes into contact with a striker 204a, which is a protruding portion attached to the front cover 204, to push the lock shaft 42 downward. FIG. 11B is a view in which a cover provided in the locking mechanism 40 is omitted and the striker receiver 43 and the lock shaft 42 are taken out so as to be easily seen.

Figure 12:
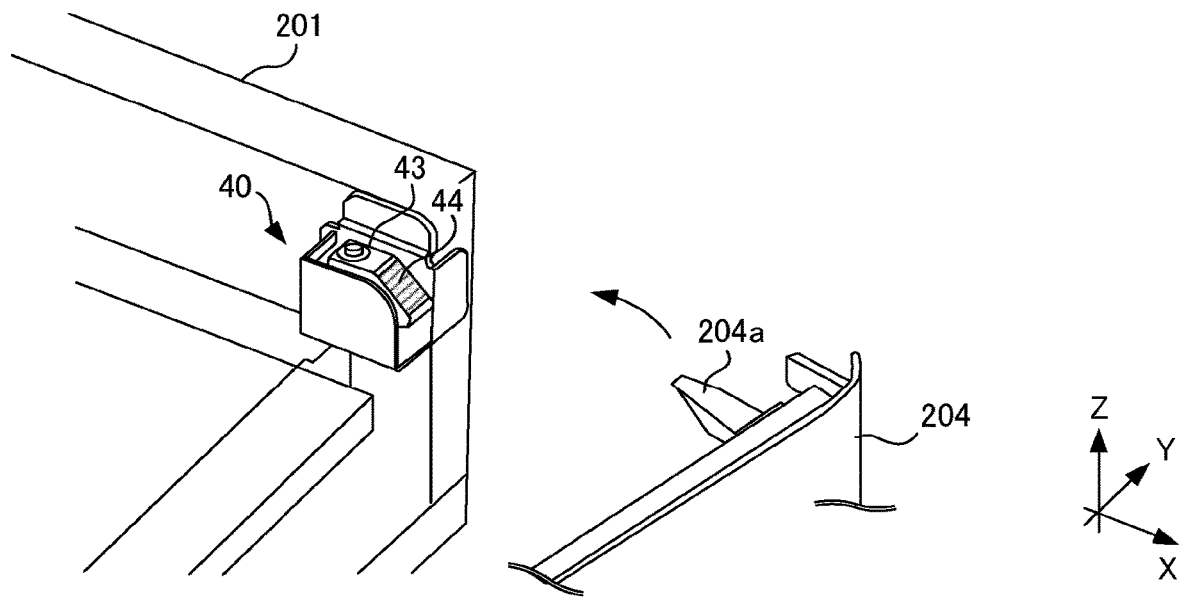
FIG. 12 is a perspective view of an example of the operation of a front cover and the operation of the lock.

When the front cover 204 is closed, the striker 204a attached to the front cover 204 comes into contact with the striker receiver 43 as illustrated in FIG. 12. The striker receiver 43 moves in the −Z direction, that is, downward by being pushed along an inclined portion 44 indicated by diagonal lines.

Figure 13:
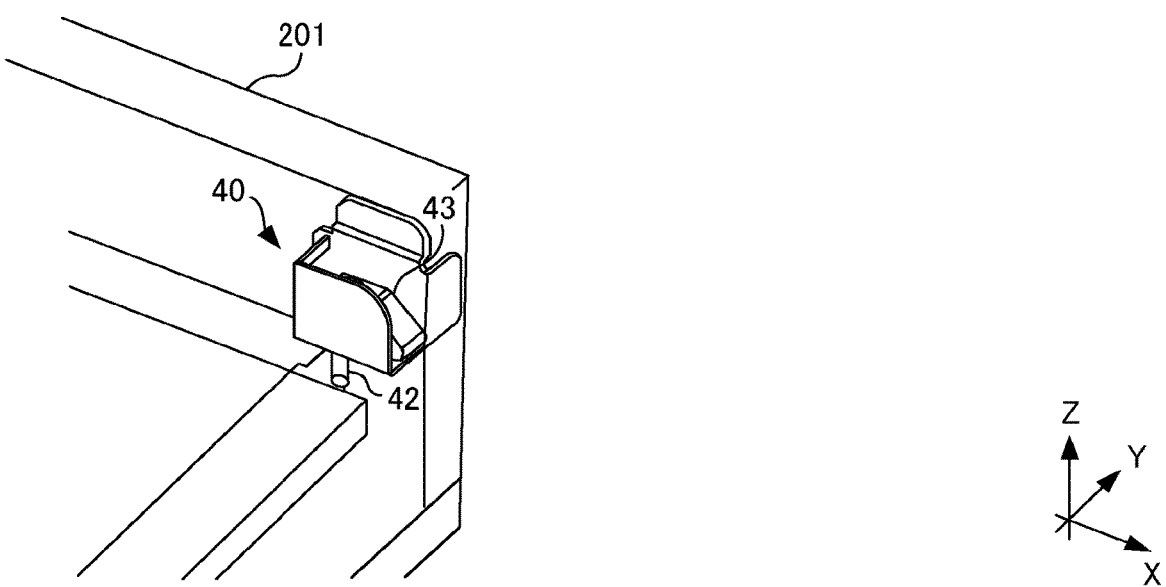
FIG. 13 is a perspective view of an example of the operation of the front cover and the operation of the lock.

That is, by such an operation, the lock shaft 42 moves downward, and as illustrated in FIG. 13, the lock shaft 42 is brought into a position in which the lock shaft 42 abuts against or is fitted to the drawer 20. In FIG. 13, the front cover 204 and the striker 204a are omitted for simplicity.

The lock shaft 42 may have a step.

The lock shaft 42 protruding downward in this manner can prevent the drawer 20 from unintentionally jumping out in a state in which the front cover 204 is supported.

When the front cover 204 is completely closed, the striker 204a is engaged with an upper portion of the striker receiver 43, so that the lock shaft 42 is continuously pressed downward and the locked state is continued.

When the front cover 204 is opened, the lock shaft 42 is flipped upward by the compression spring 45 to release the locked state, so that the drawer 20 can be pulled out.

In the present embodiment, the cord guide 21 includes the pivoting member 21a, the pivoting member 21b, and the torsion spring 23. The torsion spring 23 is disposed between the pivoting member 21a and the pivoting member 21b at a position at which the pivoting member 21a and the pivoting member 21b are fitted. The torsion spring 23 biases the pivoting member 21a and the pivoting member 21b in the directions in which the pivoting member 21a and the pivoting member 21b are closed.

With such a configuration, when the user pulls out the drawer 20, the drawer 20 is biased by the cord guide 21 in a direction in which the drawer 20 is semi-automatically pulled in, and thus the operability of the user is improved.

In addition, in the present embodiment, the drawer 20 includes the locking mechanism 40 that is a lock unit. The locking mechanism 40 locks the drawer 20 in a state in which the drawer 20 is housed in the housing 201.

The lock shaft 42 protruding downward in this manner can prevent the drawer 20 from unintentionally jumping out in a state in which the front cover 204 is supported.

In addition, in the present embodiment, the cord guide 21 is disposed between the drawer 20 and the housing 201 in a state in which the drawer 20 is housed in the housing 201 and the pivoting member 21a and the pivoting member 21b are closed and stored in the housing 201. With such a configuration, the wires 22 can be accommodated on the cord guide 21 in a space-saving manner without being entangled.

Further, in the present embodiment, the pivoting member 21a and the pivoting member 21b have the same shape, and are inverted by 180 degrees from each other and connected to each other at the position at which projecting portion 213 and the opening portion 212 are fitted.

Such a configuration in which the plurality of pivoting members 21a and 21b having the same shape are connected enables the length of the cord guide 21 to be changed to various lengths and the number of parts to be reduced to contribute to cost reduction.

In the present embodiment, the pivoting member 21a and the pivoting member 21b hold the wires 22 placed between the electronic devices mounted on the drawer 20 and the housing 201.

With such a configuration, the wires 22 are placed on the linear portion 211, and the wires 22 also move along rotation and deformation between the pivoting member 21a and the pivoting member 21b. Therefore, entanglement of the wires 22 caused by the drawing operation of the drawer 20 and application of an unnecessary load to the electronic device can be reduced.

Although some embodiments of the present disclosure have been described above, the present disclosure is not limited to such a specific embodiment, and various modifications and changes can be made within the scope of the gist of the present disclosure described in the claims unless otherwise specified in the above description. The effects described in the embodiment of the present disclosure are merely examples of the effects produced by the present disclosure, and the effects of the present disclosure are not limited to those described in the embodiment of the present disclosure.

For example, the image forming apparatus according to an embodiment of the present disclosure can be applied to various devices such as a printer, a facsimile, a copying machine, and a multifunction peripheral. In addition, the recording medium P may be any type of sheet of paper (for example, thick paper, a postcard, an envelope, plain paper, thin paper, coated paper (coated paper, art paper, or the like), tracing paper, or the like), or may be any sheet-shaped material capable of forming an image thereon, such as an overhead projector (OHP) sheet, an OHP film, or a resin film.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present disclosure.

What is claimed is:

1. A drawer mechanism comprising:
a housing having an open side;
a drawer incorporated in the housing and configured to be insertable into and drawable from the open side of the housing; and
a connector connecting the housing and a rear side of the drawer in a drawing direction of the drawer,
the connector including:
a first pivoting member;
a second pivoting member; and
a biasing member,
wherein the biasing member is disposed at a contact portion between the first pivoting member and the second pivoting member and configured to bias the first pivoting member and the second pivoting member in directions in which the first pivoting member and the second pivoting member are closed.

2. The drawer mechanism according to claim 1, wherein the drawer mechanism includes a lock configured to lock the drawer in a state in which the drawer is housed in the housing.

3. The drawer mechanism according to claim 1, wherein the connector is disposed between the drawer and the housing in a state in which the first pivoting member and the second pivoting member are closed with the drawer being housed in the housing.

4. The drawer mechanism according to claim 1, wherein the first pivoting member and the second pivoting member have a same shape, and are connected to each other at the contact portion in a state in which the first pivoting member and the second pivoting member are inverted by 180 degrees from each other.

5. The drawer mechanism according to claim 1, wherein the biasing member is a torsion spring having one end of the torsion spring attached to the first pivoting member and another end of the torsion spring attached to the second pivoting member.

6. The drawer mechanism according to claim 1, wherein the first pivoting member and the second pivoting member are configured to hold a wire between an electronic device mounted on the drawer and the housing.

7. An image forming apparatus comprising:
the drawer mechanism according to claim 1; and
an image forming device on an upper portion of the drawer mechanism.

* * * * *